United States Patent Office 3,109,197
Patented Nov. 5, 1963

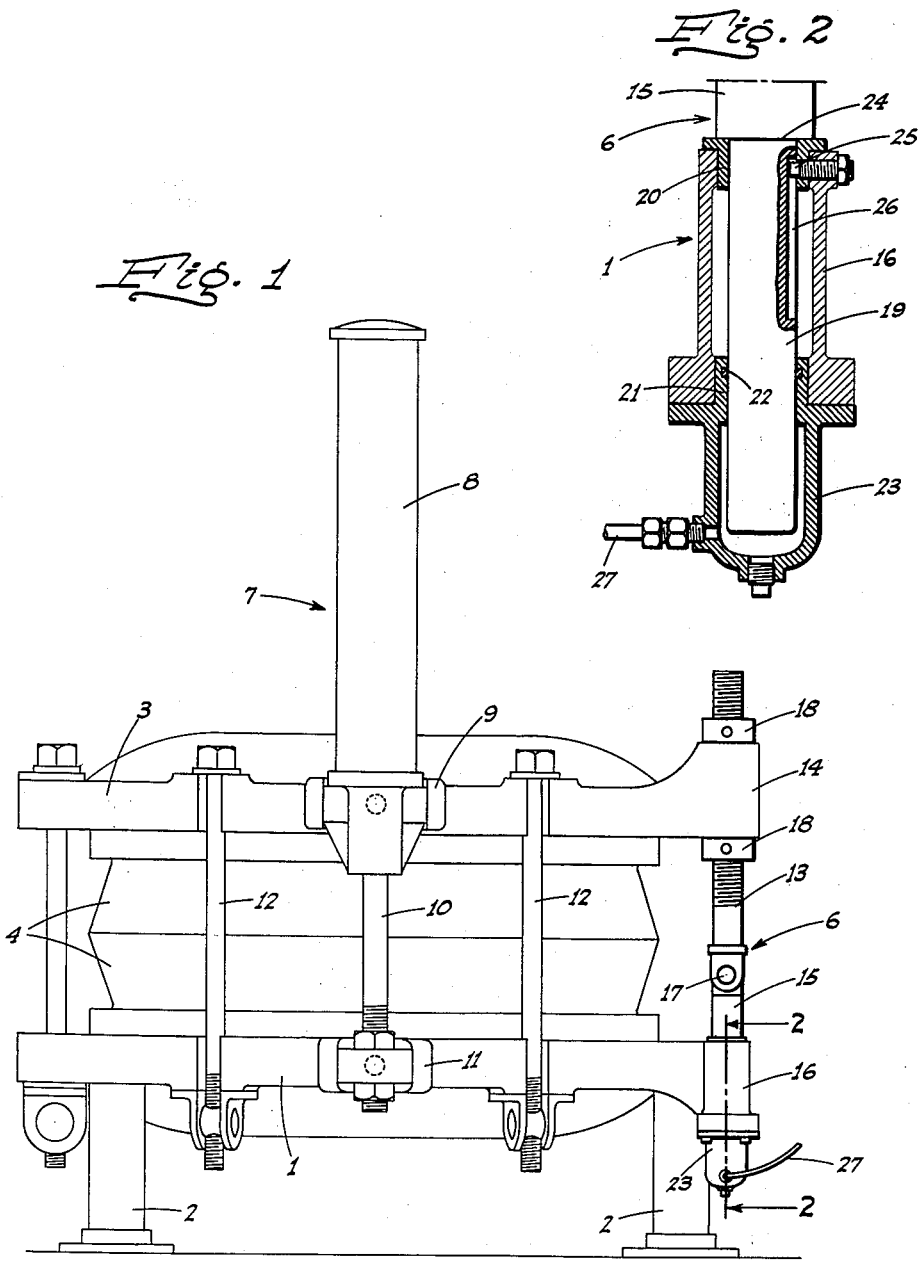

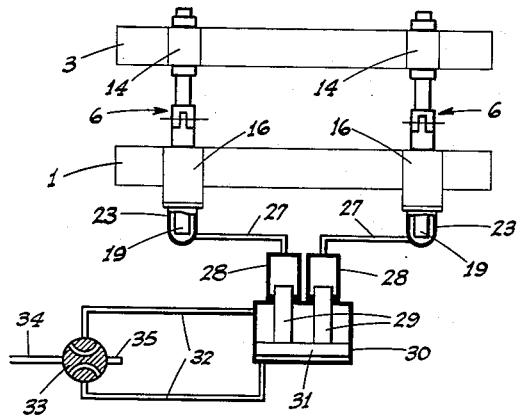
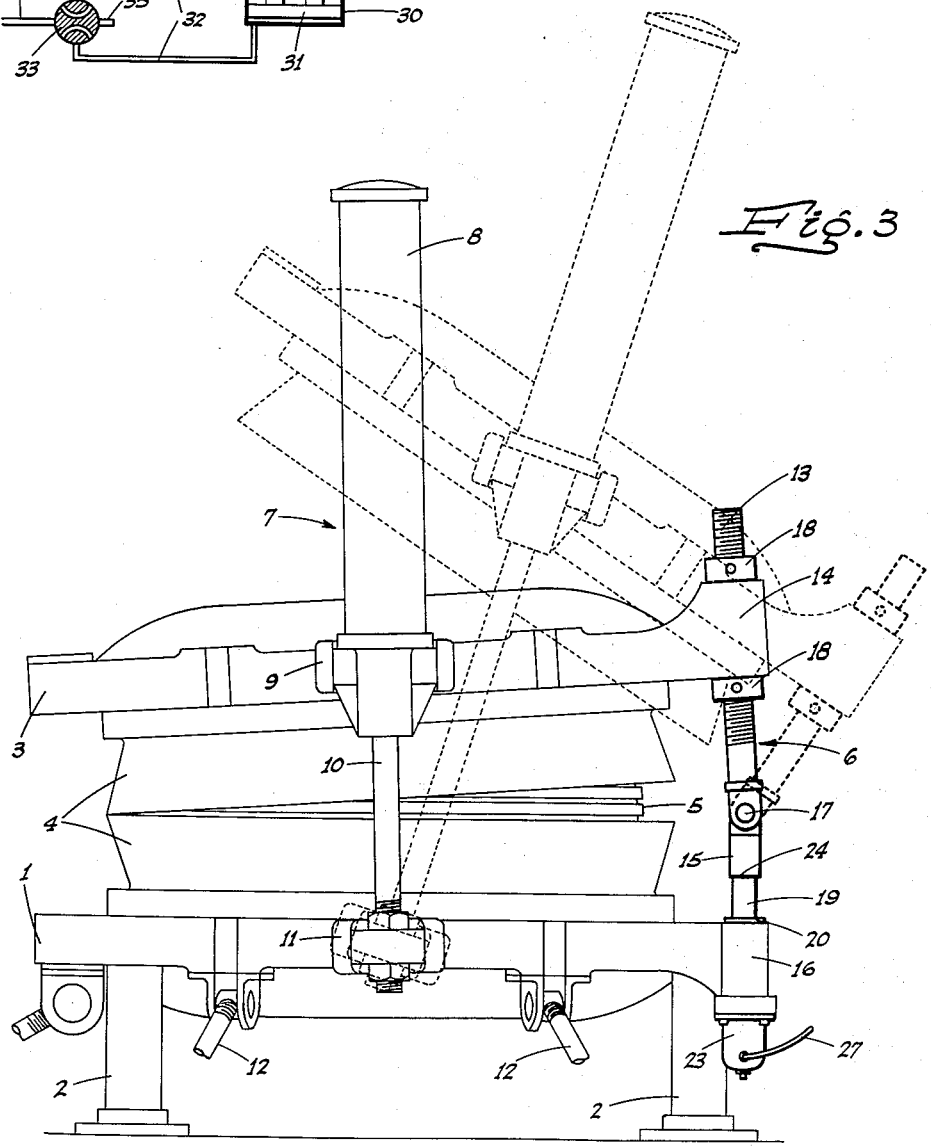

3,109,197
POWER-ADJUSTED HINGE UNIT FOR A TIRE RETREADING MOLD
William Sunday, Lodi, Calif., assignor to Super Mold Corporation of California, Lodi, Calif., a corporation of California
Filed Aug. 1, 1960, Ser. No. 46,474
1 Claim. (Cl. 18—18)

This invention relates to a tire retreading mold of what is known in the industry as the clamshell type, such as is shown in United States Patent No. 2,745,137, and particularly to the platen-connecting hinge units of the mold; the hinge units of the present invention, and their mounting and control, being an improvement over what are shown in said patent.

When the hinge units are immovable relative to the tire-embracing matrix sections after being once adjusted to a predetermined position, as in said patent, the upward swing of the upper matrix section about the hinge units as an axis was found to cause a slow and inefficient breaking-away of the tire from said matrix section at the area adjacent the hinge units.

It is therefore the major object of the present invention to so construct, mount, and control the hinge units that the upper matrix section of the mold may be raised almost straight up for a short distance adjacent the hinge units and from a fully closed position of the mold before any upward swing of said matrix section about the hinge units as an axis is effected.

In this manner, the upper matrix section is positively and cleanly broken away from the tire upon said matrix section being then swung up about the hinge units as an axis.

The hinge units are also constructed so that the normal or initial height of the upper platen of the mold from the lower platen thereof may be altered so as to accommodate matrix sections of different widths as are needed for tires of corresponding different widths. Also, this leaves the axis of the hinge units always at the same level relative to the lower platen of the mold when said mold is closed, as has been found desirable for the most efficient operation.

The mold includes a pair of the hinge units arranged in transversely spaced relation, and another object of this invention is to provide a power means for raising both hinge units simultaneously and to exactly the same extent as is necessary to avoid binding of the hinge units.

Air pressure is the source of power, and a further object of the invention is to provide a compact unit, under manual control, which utilizes the available air pressure to create a higher hydraulic pressure which is supplied in equal amounts to the hinge units to actuate the same.

An additional object of the invention is to provide a practical, reliable, and durable power-adjusted hinge unit for a tire retreading mold, and one which will be exceedingly effective for the purpose for which it is designed.

These objects are accomplished by means of such structure and relative arrangement of parts as will fully appear by a perusal of the following specification and claims.

In the drawings:

FIG. 1 is a side outline of a clam-shell mold in closed position, showing the improved hinge unit applied thereto.

FIG. 2 is an enlarged fragmentary sectional elevation of the hinge unit and adjacent parts, taken on line 2—2 of FIG. 1.

FIG. 3 is a side outline of the mold similar to FIG. 1, but showing the upper matrix section as tilted away from the lower matrix section by power actuation of the hinge units so as to initially break the upper matrix away from the tire at a point adjacent the hinge units before the mold is actually opened.

FIG. 4 is a diagram showing the common control means for the power operation of the two hinge units of the mold.

Referring now more particularly to the drawings and to the characters of reference marked thereon, the mold to which the improved hinge units are applied includes a lower platen 1 supported in a fixed position on legs 2; an upper platen 3 spaced from the platen; and upper matrix sections 4 to receive a tire 5 secured on the platens. A pair of hinge units, indicated generally at 6 and later described in detail, connect the platens radially out from the matrix sections; said units being disposed equal distances on opposite sides of a line diametrally of the mold, or as shown in said Patent No. 2,745,137.

The platens are opened and closed relative to each other by means of upstanding air cylinder units 7 disposed on opposite sides of the platens and of such diametral line. Each such unit comprises a cylinder 8 attached to the upper platen 3 by a swivel connection 9, and a piston rod 10 connected to the lower platen by a swivel connection 11. The mold is held in a closed position by a number of releasable tie or locking rods 12 connecting the platens.

Each hinge unit 6 is constructed and controlled as follows:

Such hinge unit comprises an upper threaded post 13 projecting through a guide sleeve 14 on the upper platen 3, and a lower post 15 projecting through a sleeve 16 on the lower platen 1. The posts are connected at adjacent ends by a transverse hinge pin 17. The posts when alined are parallel to the axis of the mold when closed. The upper post 13 is engaged on opposite ends of the sleeve 14 by locking nuts or collars 18 so that the extent of projection of the post through the sleeve may be altered as may be necessary.

As particularly shown in FIG. 2, the major lower portion of the lower post 15 is in the form of a piston 19 slidably guided by a bushing 20 in the sleeve 16 at its upper end and by another bushing 21 in said sleeve at its lower end. A packing gland 22, which engages the piston 19, is included in bushing 21.

The bushing 21 is formed on the upper end of a depending cylinder 23 into which the piston projects; said cylinder being secured on the lower end of the sleeve in a suitable manner. An enlarged shoulder 24 is formed on post 15 at the upper end of the piston 19 adapted to seat on the upper end of bushing 20 and limit downward movement of said piston in the sleeve 16 and cylinder 23; the piston then depending nearly to the bottom of the cylinder, as shown.

Upward movement of the piston 19 and post 15 as a whole is limited by means of a radial stop pin 25 mounted in the bushing 20 and the adjacent portion of the sleeve 16 and engaging at its inner end in a longitudinal groove 26 in the piston 19; said pin also preventing rotation of the post 15 and the hinge unit as a whole.

From the above description it will be seen that if the lower post is raised from its lowered shoulder-seated and mold-closed position, as shown in FIG. 1, and when the tie rods 12 are released, the upper platen 1 and the related matrix section 4 will be tilted up at the hinged side of the mold, as shown in FIG. 3, and said matrix section will be broken away from the tire in the mold at said side.

Simultaneous and equal raising of both hinge unit pistons is effected in the following manner, particular reference being had to FIG. 4.

The cylinder 23 of both hinge units are connected by separate conduits 27 to one end of separate cylinders 28 having pistons or plungers 29 therein. These plungers extend through opposite ends of cylinders 28 into a larger cylinder 30 where they are connected to a piston 31. The cylinder 30 is rigid with cylinders 28, but has no communication therewith.

When pistons 19 are advanced in or near the bottom of cylinders 23, the plungers 29 are retracted in cylinders 28, as shown in FIG. 4; the various cylinders and the conduits 27 being kept completely filled with hydraulic fluid. Therefore, when the plungers 29 are advanced in the cylinders 28, by the advance of piston 31, the fluid in cylinders 28 is displaced and forced in equal amounts into the cylinders 23, forcing the pistons 19 upwardly, with the result previously described.

To thus move the piston 31, air conduits 32 are connected to cylinder 30 on opposite sides of the piston 31, a manual four-way valve 33 being interposed in said conduits. The valve is also connected to an air pressure supply conduit 34 and to an exhaust outlet 35; the valve being arranged relative to the conduits and outlet so that air under pressure may be fed to either end of the cylinder 30 alternately while being exhausted from the other end. Return of the piston 31 and the plungers 29 connected thereto to their retracted position of course allows hydraulic fluid to be forced back into cylinders 28 from cylinders 23, since the weight of the upper mold platen 3 and parts connected thereto acts to lower the pistons 19 as the hydraulic pressure thereon is relieved by the retraction of the plungers 29.

The cylinders 23 and 28 are the same size, and the conduits 27 are also the same size and length so as to assure equal lifting pressures being applied to both pistons 19 simultaneously, and thus avoiding the possibility of uneven lifting of the mold platen and the resultant binding of the hinge pistons in their bearing bushings.

Compressed air is used to provide the hydraulic pressure for the reason that air compressing units are found in all tire retreading shops, whereas hydraulic pressure pumps and the accompanying necessary equipment are not.

Hydraulic pressure is however preferable to air pressure for lifting the hinge portions, since a high hydraulic pressure may be obtained in a small space, and there is no resiliency or undesired "bounce" to the action. The air pressure obtainable is limited by the capacity of the compressor usually available, and is insufficient to actuate the hinge pistons when under load unless their cylinders, and the pistons themselves, are excessively large.

In operation, to open the mold the hinge units are first actauted to initially break the upper matrix away from the tire, as previously described, after which the air cylinder units 7 are actuated to lift the upper mold platen and the related matrix section about the hinge pins 17 as an axis, as indicated in dotted lines in FIG. 3.

The lower hinge posts 15 remain raised until the mold is to be again closed. The units 7 are then again actuated until the upper matrix section 4 has been swung down to a position parallel to the lower matrix section. The valve 33 is then actuated to cause the final lowering of the upper matrix section by the air units 7, to be accompanied by a lowering of the hinge units, so that the upper matrix section is lowered to a final closed position on the lower matrix section while remaining parallel thereto.

From the foregoing description it will be readily seen that there has been produced such as device as will substantially fulfill the objects of the invention, as set forth herein.

While this specification sets forth in detail the present and preferred construction of the device, still in practice such deviations from such detail may be resorted to as do not form a departure from the spirit of the invention, as defined by the appended claim.

Having thus described the invention the following is claimed as new and useful, and upon which Letters Patent are desired:

A tire retreading mold which includes separate platens having facing matrix sections mounted thereon to embrace a tire, a pair of transversely spaced hinge units, each unit comprising separate members pivotally connected together at adjacent ends, one member of each unit being secured to one platen, means mounting the other member of each unit on the other platen for movement parallel to the axis of such platen, a piston rigid with each of said other members and projecting as an extension thereof, cylinders fixed on said other platen, said pistons being slidably mounted in said cylinders, and means to supply hydraulic fluid under pressure within the cylinders and against the ends of the pistons therein simultaneously and to the same extent and pressure.

References Cited in the file of this patent

UNITED STATES PATENTS

| | | |
|---|---|---|
| 2,231,254 | Cleveland | Feb. 11, 1941 |
| 2,489,486 | Glynn | Nov. 29, 1949 |
| 2,499,563 | Bill | Mar. 7, 1950 |
| 2,736,060 | Glynn | Feb. 28, 1956 |
| 2,958,897 | Millhoff | Nov. 8, 1960 |